Dec. 12, 1939.  W. E. MOULTON  2,182,901

FISHING ROD HANDLE

Filed March 7, 1939

INVENTOR.
WALTER E. MOULTON
BY
HIS ATTORNEY.

Patented Dec. 12, 1939

2,182,901

UNITED STATES PATENT OFFICE 2,182,901

FISHING ROD HANDLE

Walter E. Moulton, Geneva, Ohio, assignor to The American Fork & Hoe Company, Cleveland, Ohio, a corporation of Ohio Application March 7, 1939, Serial No. 260,324

7 Claims. (Cl. 43—22)

My invention relates to fishing rod handles and relates more particularly to improved and novel means for detachably mounting a conventional type reel thereon.

Prior fishing rod handles of the type with which I am familiar have had the clamping means operable within or closely adjacent the reel receiving portion of the handle making it difficult to secure the reel to the handle or to remove it therefrom due to the limited space allowed thereby. I provide a handle having a relatively unobstructed reel receiving portion and clamp means operable at the rear extremity of the handle.

Other devices of the prior art with which I am familiar although certain of these are operated from the rear of the handle require considerable manipulation to secure the reel in place on the handle.

It is an object of my invention to provide improved means for securing a conventional type reel to the reel seat of a fishing rod handle which will be simple in construction, easily operated and effective in use.

Another object of my invention is to provide improved means for detachably securing such reels to the handle.

Another object of my invention is to provide improved means for detachably securing such reels to the handle which will lock the reel in position and hold it rigidly on the handle.

Another object of my invention is to provide improved means for detachably securing varying size reels of the type described to a fishing rod handle.

Other objects of my invention and the invention itself will become increasingly apparent from a consideration of the following description and drawing wherein.

Figure 2:
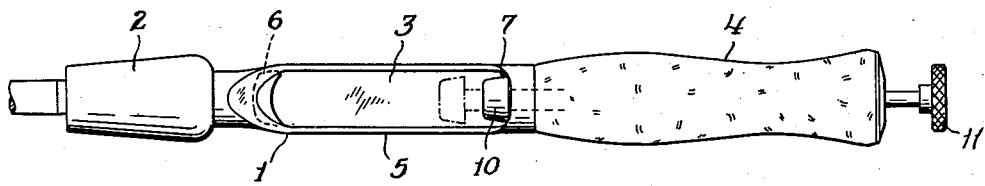
Fig. 2 is a top plan view of the handle of Fig. 1.

Referring now to the drawing, I have shown at 1, a fishing rod handle preferably formed of light metal, such as aluminum, including a tubular portion 2 adapted to receive the butt end of a fishing rod, an intermediate reel seat portion 3 and a hand grip portion 4. The hand grip portion 4 is preferably encased in cork or the like to afford a more secure hand grip. The reel seat 3 comprises a depressed portion upon which the reel base rests having upstanding lateral flanges 5—5 limiting transverse movement of the reel base and an under cut portion forming a pocket 6 adapted to receive the toe of the reel base and an upstanding pocket 7 adapted to receive the reel base heel.

Figure 4:
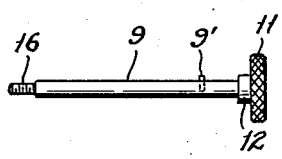
Fig. 4 is an elevational view of another portion of the clamping means of my invention.
Figure 5:
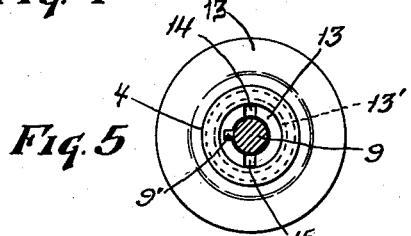
Fig. 5 is an end view of a handle showing the clamping means of my invention applied thereto.

The hand grip portion 4 of the handle is centrally bored for the reception of a clamp member 7 composed in the form shown of a pair of stem portions 8 and 9, each provided with an enlarged end portion, the stem portion 8 being provided with an enlarged end 10 of generally frusto-conical form, and the stem 9 being provided with an enlarged head portion 11 which in the form shown in the drawing herein has a collar 12 associated therewith. As shown in Fig. 4, the stem portion 9 is further provided with an outstanding lug or ear 9' which is adapted to hold the clamp against inward movement, suitable movement thereof which will later be more fully described herein.

Adjacent the outer end of the hand grip portion 4 and intermediate the bore disposed centrally thereof and the stem 9 projected therethrough, a plug 13 is inserted, said plug having a slot extending centrally thereof to provide oppositely disposed perforations 14 and 15 therein but conforming generally to the cylindrical shape of the stem 9 and press fitted thereto. The threader end of the hand grip portion 4, on which plug 13 is threaded, is turned over the end of a ring or ferrule 13' which is preferably placed over the outer end of said plug 13 to rigidly secure the plug 13 in engagement with the grip portion of the handle and the collar 12 is preferably so formed as to be surrounded by the ring when the clamp is in its most extended position locking engagement with a reel.

The stem portions 8 and 9 of the clamp member 7 are adapted to be screw threaded together by means of the screw 16 of the stem 9 and the threads 17 of the stem 8, the inner end 19 of the stem 8 being adapted to press against a spring 20 which is telescoped about the screw 16 and the stem 9 and is carried within the cylindrical bore extending longitudinally throughout the hand grip portion 4. The stem portion 9 is preferably in the form shown of smaller diameter than the stem portion 8.

Although I have described the particular type of threading and spring means used herein, I do not desire my invention to be limited to the details thereof as I contemplate that various changes can be made in the particular construction of these portions of the clamping member.

Figure 1:
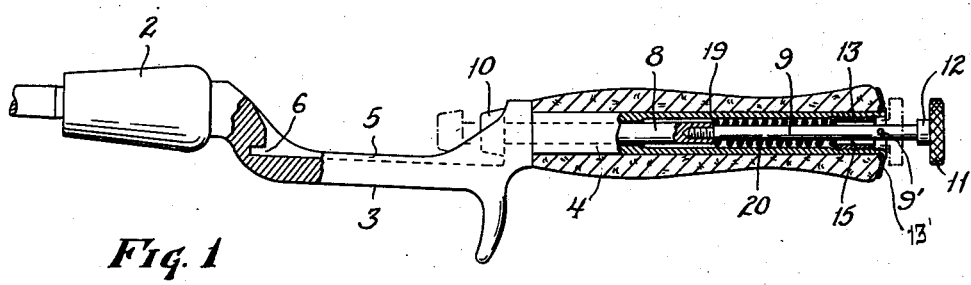
Fig. 1 is an elevational view of a fishing rod handle embodying my invention, part of the same being shown in section and dotted lines illustrating one of the operative positions which the clamping means of my invention will take.
Figure 3:
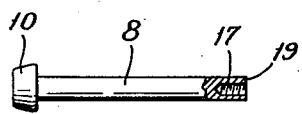
Fig. 3 is an elevational view of a part of the clamping means of my invention as illustrated in Fig. 1.
Figure 6:
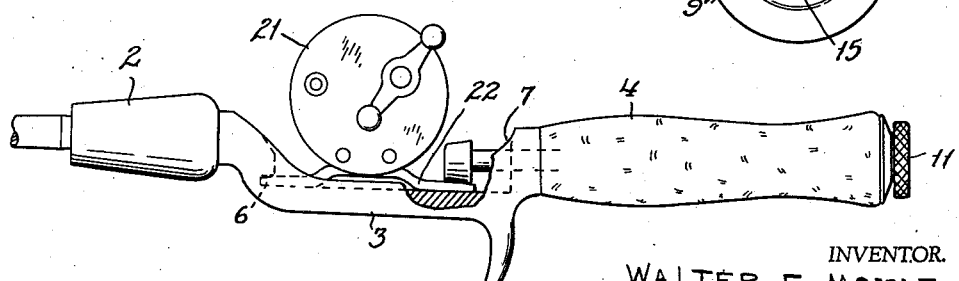
Fig. 6 is an elevational view of a fishing rod handle embodying my invention and showing a conventional reel affixed thereto.

The reel 21 is of the conventional type and provided with a reel base 22 generally rectangular in form and preferably arched upwardly axially thereof as indicated in Fig. 6. The forward end of the reel base is adapted to be received within the pocket 6 formed by undercutting the front wall of the reel seat, and the rear portion of the reel base is clamped to the reel seat by grasping the head 11 of the stem 9, withdrawing the stem a desired distance outwardly of the hand grip portion compressing the spring, rotating the head so that the lug or ear 9' which is spaced from the head 11 is withdrawn from either of the slots 14 and 15 and rests upon the outer face of one of the generally cylindrical portions of the plug 13 thus carrying the stem 8 and its associated end portion 10 to its rearmost position as shown in solid lines in Fig. 1 hereof. This permits the rear portion of the reel base to be placed in position in the pocket formed by the heel portion of the reel seat and the end portion 10. By quickly rotating the head 11 to bring the lug or ear 9' into alignment again with one of the slots 14 or 15 the stem is pulled out of locking engagement with the plug and the release of the spring 20 thereby forces the stem portion 8 and its enlarged frusto-conical end portion 10 to ride over the upper rear face of the reel base and by virtue of the same the reel base is securely locked in wedged position with the reel seat.

Since the end portion 10 may take a plurality of positions according to the size of the reel and the degree of curvature of the reel base thereof, smaller reels generally having a sharper or shorter radius than larger ones, the clamp of my invention is adapted to mount various size reels.

Although I have shown and described a preferred embodiment of my invention I contemplate that numerous and extensive departures may be made therefrom without departing from the spirit of my invention and the scope of the appended claims.

I claim:

1. The combination with a fishing rod handle comprising a reel support having a rod receiving socket at its forward end and a tubular hand grip at its rear end, and a reel seat intermediate said ends, of unitary reel clamping means comprising a stem projected through the bore of the hand grip, a wedge clamp element extending forwardly of the hand grip and a hand operable element disposed exteriorly of and to the rear of the hand grip, a spring exerting forward pressure on said clamping means tending to urge said clamp to make clamping engagement with the base of a fish line reel seated on said seat, and stop means comprising cooperating elements of said hand grip and said clamping means to hold said clamp in a rearwardly withdrawn inoperative position, said hand operable element adapted for rendering said stop means optionally operative or inoperative.

2. In combination with a fishing rod handle having a forwardly disposed rod receiving end, a rearwardly disposed hand grip, and an intermediately disposed reel seat, the combination of reel clamping means comprising a stem projected through a longitudinal bore of the hand grip, said means having at its forward end a reel base clamping element, and at its rear end a manually operable part disposed exteriorly of the rear end of the hand grip, a spring exerting pressure tending to force said clamping means forwardly to effect clamping engagement between said element and the base of a seated fish line reel and said seat, said part adapted for rotative movement and adapted to retract said means against the pressure of said spring, stop means for holding said clamping means in a retracted position and for releasing it therefrom.

3. In a fishing rod handle, a tubular hand grip, a reel seat base, and a clamp element comprising an intermediate stem portion and enlarged heads on its two ends, said stem portion loosely telescoped within the bore of said hand grip with the said heads projecting from the respective ends thereof, the forwardly disposed head comprising a reel base clamping element, the rearmost head comprising a hand operable part, a helical spring disposed within the grip bore over said stem and exerting forwardly directed pressure on said clamp element, said clamp element adapted to be longitudinally retracted from reel base clamping position by manually effected rearward movement of the rearmost head, stop means to maintain said clamping means in retracted position against the pressure of said spring, and means associated with said clamping means and said handle for retaining said clamping means in rearwardly withdrawn inoperable position, said rearmost head when retracted rendering said stop means inoperative.

4. The combination with a fishing rod handle comprising a tubular hand grip and reel seat, said seat having a portion so formed as to receive the toe of a reel base, a clamp element including a stem and clamping head, said stem telescoped through said hand grip, resilient means within the hand grip exerting pressure to urge said head forwardly into engagement with the heel of a reel base to rigidly secure it on said seat, and manually operable means projecting rearwardly from said stem exteriorly of said hand grip for retracting said clamping head from clamping engagement with said reel base heel.

5. The combination with a fishing rod handle comprising a tubular hand grip and reel seat, said seat having a portion so formed as to receive the toe of a reel base, a clamp element including a stem and clamping head, said stem telescoped through said hand grip, resilient means within the hand grip exerting pressure to urge said head forwardly into engagement with the heel of a reel base to rigidly secure it on said seat, and manually operable means projecting rearwardly from said stem exteriorly of said hand grip for retracting said clamping head from clamping engagement with said reel base heel, and stop means comprising cooperative surfaces of said stem and said hand grip adapted to effect holding of said clamp element in retracted position when said manually operable means is rotated to a given rotative position.

6. A fishing rod handle comprising a tubular hand grip and reel seat, the forward end of said seat having a slot adapted to receive the forward end of a reel base, a clamp element comprising a stem and clamping head, said stem telescoped through said hand grip, resilient means within the hand grip exerting pressure to urge said head forwardly into engagement with the rearward end of said reel base, and means disposed at the rearward end of said hand grip portion associated with said stem whereby said clamping head may be retracted from said clamping engagement with said reel base and locked in said retracted position.

7. A fishing rod handle comprising a tubular hand grip and reel seat, the forward end of said seat having a slot adapted to receive the forward end of a reel base, a clamp element comprising a stem and clamping head, said stem telescoped through said hand grip, resilient means within the hand grip exerting pressure to urge said head forwardly into engagement with the rearward end of said reel base, and means disposed at the rearward end of said hand grip portion associated with said stem whereby said clamping head may be retracted from said clamping engagement with said reel base.

WALTER E. MOULTON.